G. SHEFTS.
MOTOR VEHICLE BODY.
APPLICATION FILED MAR. 26, 1921.

1,387,911.

Patented Aug. 16, 1921.
2 SHEETS—SHEET 1.

Witness

Inventor.
George Shefts
by Jas. L. Skidmore
his Attorney.

G. SHEFTS.
MOTOR VEHICLE BODY.
APPLICATION FILED MAR. 26, 1921.
1,387,911.
Patented Aug. 16, 1921.
2 SHEETS—SHEET 2.
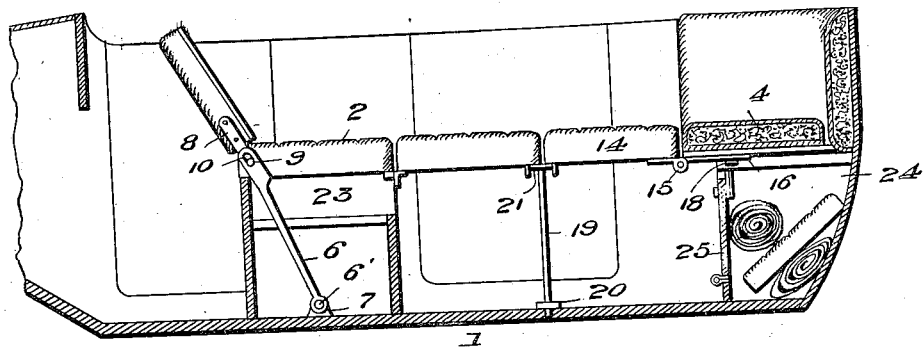
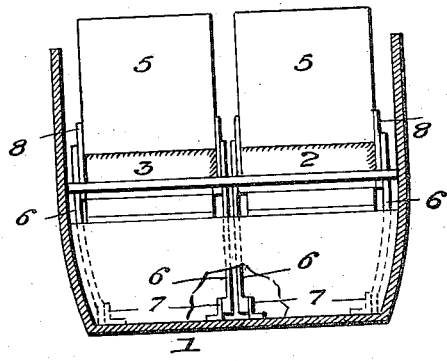
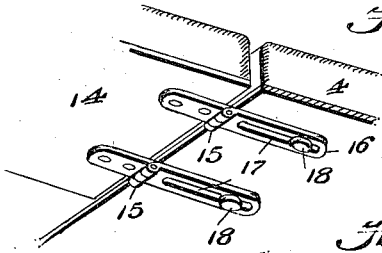
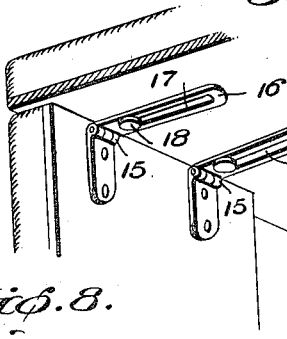
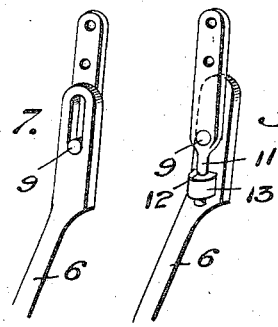
Witness
Inventor
George Shefts
by Jas. L. Skidmore
his Attorney

UNITED STATES PATENT OFFICE.

GEORGE SHEFTS, OF WASHINGTON, DISTRICT OF COLUMBIA.

MOTOR-VEHICLE BODY.

1,387,911. Specification of Letters Patent. Patented Aug. 16, 1921.

Application filed March 26, 1921. Serial No. 455,879.

*To all whom it may concern:*

Be it known that I, GEORGE SHEFTS, a citizen of the United States, residing at Washington, District of Columbia, have invented certain new and useful Improvements in Motor-Vehicle Bodies, of which the following is a specification.

This invention relates to certain new and novel improvements in motor vehicle bodies, and is especially designed to provide means whereby the body may be easily and readily converted into a bed or couch, so as to provide both means of transportation and shelter.

The prime object of the invention is to provide the vehicle body with simple, durable, economical and efficient means whereby the seats of the vehicle may be rapidly converted into a bed or couch arranged along one side of the body, leaving the opposite side in its original condition, thus permitting one of the occupants to sleep during a long journey while another is driving the vehicle, or converting the vehicle into an ambulance with a bed or couch for the patient to repose, and seats for the driver and attendant.

A further object is to so construct the vehicle body as to arrange the bed or couch for the repose of a plurality of occupants of the vehicle when it is desired, when they are compelled to sleep in the vehicle for shelter overnight, the said body and its parts being so constructed and arranged that the vehicle will not perceptibly differ in appearance from an ordinary motor vehicle when utilized for the purpose of transportation.

The foregoing and such other objects as may appear from the ensuing description, are attained by the construction, arrangement, location and combination of the parts hereinafter more fully described, illustrated by the accompanying drawings, and particularly pointed out in the claims appended hereto, it being understood that slight changes in the proportions and minor details of construction may be resorted to without departing from the spirit or sacrificing any of the advantages of the invention.

In the accompanying drawings forming a part of this specification, it will be seen that:

Fig. 3 is a longitudinal section through a vehicle body of greater carrying capacity with the seats arranged to form a bed or couch.

Fig. 4 is a cross-sectional view, taken on the line 4—4 of Fig. 3.

Fig. 5 is a fragmentary perspective view showing the hinged connection between the rear seat and bed or couch section carried thereby, the parts being arranged in the position shown in Fig. 3.

Fig. 6 is a view similar to Fig. 5, with the hinged section of the rear seat in its downwardly folded position.

Fig. 7 is a fragmentary perspective view showing the connection between the back of the front seat and the pivoted rod which carries said seat, and Fig. 8 is a view similar to Fig. 7, but looking at the opposite side.

Similar numerals of reference are employed to designate like parts throughout the several views of the drawings.

Figure 1:
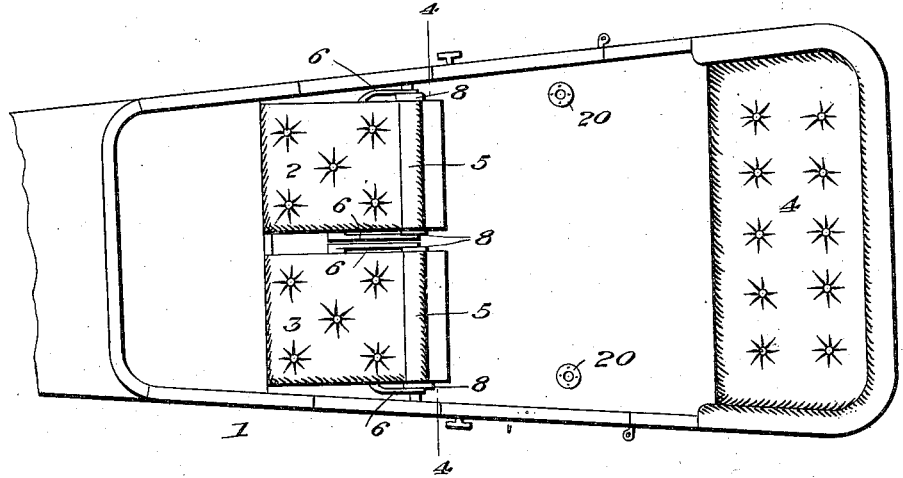
Figure 1 is a plan view of the improved motor vehicle embodying my invention, showing the seats arranged in their normal position, and the forward portion of the vehicle broken away.

In the embodiment of my invention as illustrated, the numeral 1, indicates the vehicle body, within which is suitably secured separate front seats 2 and 3, and a rear seat 4 arranged in the customary manner. The backs 5 of the front seats are hingedly mounted so as to permit of the said backs being swung either forwardly along the forward edge of the front seat, as shown in Fig. 5, or rearward between the front and rear seats, as shown by dotted lines in Fig. 2, and for this purpose there is pivotally mounted upon each side of each of the front seats 2 and 3, an arm 6, one end of said arm being pivotally secured at 6' to a bracket 7 fixed to the floor of the body 1. Each of the said arms 6 has its upper end portion pivotally secured to the backs of said seats, by means of plates 8, which are fixedly secured in any suitable manner to the said backs. Each plate 8 is provided with a fixed pin 9, extending laterally therefrom, said pin being adapted to enter an elongated opening 10 formed through the free end of each of the arms 6, and thus provide a pivotal connection between the said arms and backs, which permits the said backs being swung rearwardly to the position shown by the dotted lines in Fig. 2, to assist in bridging the space between the front and rear seats for the purpose of forming a bed or couch.

To secure the back against pivotal movement with respect to the arms 6, each plate 8 is provided at its lower end below the pivot 9, with a reduced downward extension 11, said extension being adapted to enter a socket 12 formed in a lateral extension 13 mounted on the free end of the arm 6, so that when it is desired to swing the back of each seat upon the pivot 9, it is simply necessary to raise the back which action disengages the extension 13 from the socket 12.

In vehicle bodies of the type illustrated, it is necessary to provide means in addition to the backs 5 for effectively bridging the space formed between the front and rear seats, and this is attained by means of a hinged section 14, which is adjustably secured to and carried by the rear seat 4. This section 14 is normally disposed in a depending position beneath the rear seat substantially flush with the front edge of said seat and is so connected with the seat as to permit of the section being raised to a position in horizontal alinement with the seats, which is attained by means of the hinges 15 secured to said section, each hinge being slidably connected to the seat. Each hinge is composed of a short member fixedly secured to the section 14, and a relatively long member 16, provided with a longitudinal slot 17 therethrough adapted to engage with a headed pin 18 fixedly secured to the underside of said seat and depending therefrom, which connection permits of the section 14 being slid outwardly and raised, thus coacting with the back of the front seat to bridge the space between the front and rear seats, said long member 16 of each hinge 15, and each headed pin 18 being of sufficient strength to maintain the inner end portion of the section 14 in its horizontal position at all times.

While various means may be utilized for supporting the meeting edges of the backs 5 and the sections 14 when serving as a bed or couch, I preferably employ the means shown comprising a rod 19 which is detachably disposed within a socket 20 formed within and secured to the floor of the vehicle body, one of these rods being positioned at either side of the vehicle body, and when said rods are secured in an upright position within their respective sockets, a bar 21 is suitably connected to their upper ends and the meeting edges of the backs 5, and the sections 14 are seated upon the said bar 21.

Figure 2:
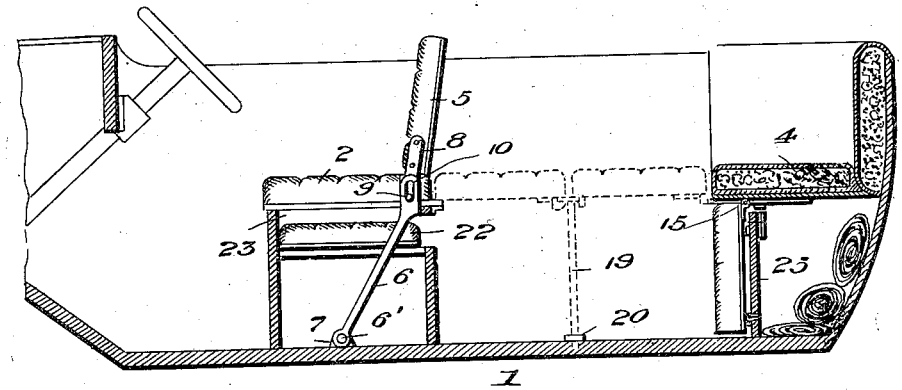
Fig. 2 is a view similar to Fig. 1, showing by dotted lines the arrangement within the body when the latter is used as a bed or couch.

When it is desired to use the vehicle body as a bed with the backs 5 of the front seats disposed along the front edge of said seat to form a foot rest or shield, as shown in Fig. 3, there is provided a supplemental bed or couch section 22, adapted to occupy the space between the front seat, and the adjacent edge of the section 14, and when the section 22 is not in use it is disposed within the compartment 23 formed beneath the front seat, as clearly shown in Fig. 2.

It will be perceived that the rear portion of the vehicle body is formed with a compartment 24 for the retention of blankets, comforts, and other desirable bed clothing, as well as for the rods 19, bar 21 and supplemental cushion sections when not in use, said compartment being provided with a hinged door 25 suitably secured and locked at the front portion of the compartment.

Having thus described my invention, what I claim and desire to secure by Letters Patent, is:

1. A vehicle body of the character described, comprising a plurality of separated front seats and rear seats in alinement therewith, each front seat having a back therewith, each front seat having a back pivotally secured thereto, means secured to each front seat back for pivotally securing said back to the upper end portion of a bar pivotally secured to the floor of the vehicle body, means formed on said bar near its upper end for rigidly securing said back in upright position, and means for securing said back in a horizontal position.

2. A vehicle body of the character described, comprising a plurality of separated front seats and rear seats in alinement therewith, each front seat having a back pivotally secured thereto, a compartment formed beneath each front seat, means secured to the lower end of each front seat back for pivotally securing said back to the upper end portion of a bar pivotally secured to the floor of the vehicle body, means projecting laterally from the upper end portion of each of said bars for securing said back in upright position, and means for securing said back in a horizontal position.

3. A vehicle body of the character described, comprising a plurality of separated front seats and rear seats in alinement therewith, each front seat having a back pivotally secured thereto, means secured to the lower end portion of each front seat back for pivotally securing said backs to the upper end portion of a bar pivotally secured to the bottom portion of said vehicle body, a socket formed at one side of each of said bars for securing said back in upright position, and means secured to the rear edge of each seat and intermediate the front and rear seats for supporting said back in a horizontal position.

4. A vehicle body of the character described, comprising a plurality of separated front seats and rear seats in alinement therewith, means secured to the lower end of each front seat back for pivotally fastening each back to the upper end portion of a bar pivotally secured to the floor portion of said vehicle body, an integral socket formed on one side of each of said bars for securing said back in upright position, and detachable and removable means whereby the space between the front and rear seats may be bridged to form a bed or couch, with the back of the front seat serving as a footboard or shield.

5. A vehicle body of the character described, comprising front and rear alined seats, a movable back for each front seat, an arm disposed at each side of each front seat with one end of said arm pivotally secured to the floor portion of the body, means for pivotally securing the upper end of the arm to said movable back, and a slidable connection between each arm and back for preventing relative pivotal movement of the same.

6. A vehicle body of the character described comprising front and rear alined seats, a movable back for each front seat, an arm located at each side of each front seat with its lower end pivotally secured to the floor portion of the body, means for pivotally securing the upper end of said arm to the movable back, an integral socket formed on the upper end portion of each arm, and means secured to said movable back for slidable engagement with said socket for holding the back against relative pivotal movement.

7. A vehicle body of the character described, comprising front and rear alined seats, a movable back for each front seat, an arm disposed at each side of each front seat with one end pivotally secured to the floor portion of the vehicle body, a slidable connection between each arm and back for preventing relative pivotal movement of the same, means secured to the rear edge of each front seat for supporting the front end of each back in horizontal position, a section pivotally and slidably mounted to the lower face of the rear seat, and detachable and removable means intermediate said front and rear seats, whereby the rear end of said back and the front end of said section are supported in horizontal alinement with said seats.

8. In a vehicle body of the character described, comprising front and rear seats, a movable back for each front seat, an arm disposed at each side of each front seat with one end pivotally secured to the floor portion of said body, a slidable connection between each arm and movable back for preventing relative pivotal movement of the same, a hinged section secured to the lower face of the rear seat, a compartment formed beneath each front seat adapted to receive a supplemental bed or couch section, means secured beneath the rear seat for holding one end of the hinged section in a horizontal position, means secured to the rear edge of each front seat for supporting the front end of a supplemental section in horizontal position, and detachable and removable means supported by the floor of the body for holding the meeting ends of the hinged section and supplemental section in horizontal alinement with the front and rear seats, while the movable back is swung forward to form a foot-board or shield.

GEORGE SHEFTS.